(12) United States Patent
Benjamin et al.

(10) Patent No.: US 9,298,850 B2
(45) Date of Patent: Mar. 29, 2016

(54) SYSTEM AND METHOD FOR EXCLUSION OF IRRELEVANT DATA FROM A DOM EQUIVALENCE

(75) Inventors: Kamara Akili Benjamin, Bellevue, WA (US); Guy-Vincent Jourdan, Ottawa (CA); Iosif Viorel Onut, Ottawa (CA); Gregor von Bochmann, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 13/458,131

(22) Filed: Apr. 27, 2012

(65) Prior Publication Data

US 2012/0278699 A1 Nov. 1, 2012

(30) Foreign Application Priority Data

Apr. 28, 2011 (CA) ........................ 2738290

(51) Int. Cl.
  *G06F 17/00* (2006.01)
  *G06F 17/30* (2006.01)
  *G06F 17/22* (2006.01)
(52) U.S. Cl.
  CPC ...... *G06F 17/30961* (2013.01); *G06F 17/2247* (2013.01)
(58) Field of Classification Search
  CPC .................................................. G06F 17/2247
  See application file for complete search history.

(56) References Cited

U.S. PATENT DOCUMENTS

| | | | | |
|---|---|---|---|---|
| 5,931,904 | A | * | 8/1999 | Banga ............... G06F 17/30899 341/55 |
| 5,937,181 | A | | 8/1999 | Godefroid et al. |
| 5,956,722 | A | * | 9/1999 | Jacobson et al. ........... 707/999.1 |
| 6,178,394 | B1 | | 1/2001 | Godefroid |
| 6,665,658 | B1 | | 12/2003 | DaCosta et al. |
| 6,938,170 | B1 | | 8/2005 | Kraft et al. |
| 7,328,269 | B1 | | 2/2008 | Danner et al. |
| 7,363,291 | B1 | * | 4/2008 | Page ................. G06F 17/30011 707/706 |
| 7,546,370 | B1 | | 6/2009 | Acharya et al. |
| 7,680,785 | B2 | | 3/2010 | Najork |
| 7,827,166 | B2 | | 11/2010 | Garg et al. |
| 8,150,878 | B1 | * | 4/2012 | Aizen et al. ................... 707/791 |

(Continued)

OTHER PUBLICATIONS

Sharma et al., "Self Adjusting Refresh Time Based Architecture for Incremental Web Crawler," IJCSNS International Journal of Computer Science and Network Security, vol. 8, No. 12, Dec. 2008, pp. 349-354;.

(Continued)

*Primary Examiner* — Keith Bloomquist
(74) *Attorney, Agent, or Firm* — Brian J. Colandreo, Esq.; Jeffrey T. Placker, Esq.; Holland & Knight LLP

(57) ABSTRACT

A computer-implemented process, computer program product, and apparatus for computing excluded data. A web page of interest is identified to form an identified page. The identified page is loaded a first time to form a first load, and responsive to a determination that a delta has not been computed for the identified web page, the identified page is loaded a second time to form a second load. Whether portions of the first load differ from portions of the second load is determined. Responsive to a determination portions of the first load differ from portions of the second load, the portions that differ to form a delta are identified. The delta is stored to form stored delta and the stored delta is excluded from a document object model associated with the identified page to form a modified document object model.

20 Claims, 8 Drawing Sheets

(56) References Cited

U.S. PATENT DOCUMENTS

| | | | |
|---|---|---|---|
| 8,413,046 B1* | 4/2013 | Mocanu | 715/234 |
| 2004/0236824 A1* | 11/2004 | Millington | G06F 17/30902 709/203 |
| 2005/0086648 A1 | 4/2005 | Andrews et al. | |
| 2005/0246682 A1 | 11/2005 | Hines | |
| 2007/0143742 A1 | 6/2007 | Kahlon et al. | |
| 2007/0226206 A1* | 9/2007 | Pavlovski et al. | 707/5 |
| 2007/0283425 A1 | 12/2007 | Ture et al. | |
| 2008/0077848 A1* | 3/2008 | Roberts | 715/229 |
| 2008/0104256 A1 | 5/2008 | Olston | |
| 2008/0235163 A1 | 9/2008 | Balasubramanian et al. | |
| 2010/0076954 A1 | 3/2010 | Dulitz et al. | |
| 2010/0262780 A1* | 10/2010 | Mahan et al. | 715/234 |
| 2012/0278059 A1 | 11/2012 | Benjamin et al. | |
| 2012/0278480 A1 | 11/2012 | Ionescu et al. | |
| 2012/0278699 A1 | 11/2012 | Benjamin et al. | |
| 2015/0121197 A1* | 4/2015 | Hoffman | H04L 63/1416 715/234 |

OTHER PUBLICATIONS

"Practical Web Crawling Issues," http://www.chato.cl/papers/crawling_thesis/practical.pdf, downloaded May 2, 2013, pp. 1-12.

Hiraishi, "Reduced State Space Generation of Concurrent Systems Using Weak Persistency," http://www.springerlink.com/content/m4762m528544r286/, IEICE Trans. Fundamentals, vol. E77-A, No. 10, Oct. 1994, downloaded on May 2, 2013, pp. 1602-1606.

Godefroid, "Partial-Order Methods for the Verification of Concurrent Systems, An Approach to the State-Explosion Problem," 1994-1995, http://toolkit.dialog.com/intranet/cgi/present?STYLE=1360084482&PRESENT=DB=35, An=1421034,FM=9,SEARCH=MD.GenericSearch, downloaded on May 2, 2013, pp. 1-136.

Karacali, "Simultaneious Reachability Analysis of Concurrent Systems," North Carolina State University, 2000, http://toolkit.dialog.com/intranet/cgi/present?STYLE=1360084482&PRESENT=DB=35,AN=1791309,FM=9,SEARCH=MD.GenericSearch, downloaded on May 2, 2013, pp. 1-24.

Dilworth, "A Decomposition Theorem for Partially Ordered Sets", Annals of Mathematics, Jan. 1950, vol. 51, No. 1, pp. 161-166.

Hsu et al., "Partitioning the Boolean Lattice into Chains of Large Minimum Size", Journal of Combinatorial Theory, vol. 97(1), Jan. 12, 2000, pp. 1-17.

Yeh et al., "Tracking the Changes of Dynamic Web Pages in the Existence of URL Rewriting," http://delivery.acm.org/10.1145/1280000/1273831/p169-yeh.pdf?key1=1273831&key2=7087235921&coll=DL&dl=ACM&CFID=5856056&CFTOKEN=88576545, downloaded on May 2, 2013, pp. 169-176.

Anderson, "Combinatorics of Finite Sets," Oxford Univ. Press, London, 1987), pp. vii-250.

* cited by examiner

Data exclusion system 300

```
<html>
    <body>
        <p>
            The content of the webpage
        </p>
        <div>
            The current time is 1:45:30 pm ──── current time
                                                    502
        </div>
        <br>
        Our sponsors:
        <a class="e" href="http://mysite/aclk?sa=1&ai=Bq7S5&adurl=http://www.mysite">
            Email Marketing Software
                                                    one sponsor
        </a>                                            504
    </body>
</html>
```

SYSTEM AND METHOD FOR EXCLUSION OF IRRELEVANT DATA FROM A DOM EQUIVALENCE

RELATED APPLICATION

This application claims the benefit of Canadian Patent Application Number 2,738,290 filed on Apr. 28, 2011, the entire contents of which are herein incorporated by reference.

TECHNICAL FIELD

This disclosure relates generally to crawling websites in a data processing system and more particularly to excluding irrelevant data from a Document Object Model (DOM) equivalence function for crawling websites in the data processing system.

BACKGROUND

A fundamental problem Web crawlers need to solve when crawling websites using WEB 1.0 and/or WEB 2.0 technologies may be unique identification of web pages and respective state of the web pages. This may be fundamental to a successful crawl, because without unique identification of web pages and respective state of the web pages the crawl may not stop. The difficulty of this task is typically amplified by WEB 2.0 technologies in which rich Internet application (RIA) websites that may have dynamic content that may change over time. In these sites, a Uniform Resource Locator (URL) may no longer synchronize with content of the page as in WEB 1.0 (for example, the URL may not necessarily change when the content of the page changes).

The problem may be amplified for web pages with content that changes over time without involving user actions. In these pages, provided logic may dictate to a website construction of portions of the content. Examples may include embedded advertisements, time display, counters of page visits over time, and others. The additional, changing data may impede an ability of an automatic crawler to identify the web page (in WEB 1.0) and the document object model states (in RIA applications), because the page or DOM may continually change.

Regardless of the web technology used, the web page at a moment in time may consist of a DOM. Crawlers may use various equivalence functions to infer whether two document object models are considered equal. The main challenge when defining equivalence functions may be to exclude the portion of the page/DOM that may introduce false negatives from the content considered using the equivalence function.

A typical current solution manually configures a crawler on a case-by-case basis. Manual configuration may force the crawler to ignore certain types of objects known to change over time, such as session identifiers and cookies. Manual configuration is typically highly inefficient, and inaccurate, because the list is typically incomplete. Using another solution, regular expressions identify in the DOM portions of content that can be ignored. The main problem with the latter solution is typically a difficulty in creating regular expressions and creating the regular expressions that differ for different sites.

SUMMARY OF DISCLOSURE

According to one embodiment, a computer-implemented process for computing excluded data comprises identifying a web page of interest to form an identified page, loading the identified page a first time to form a first load, responsive to a determination that a delta has not been computed for the identified web page, loading the identified page a second time to form a second load and determining whether portions of the first load differ from portions of the second load. Responsive to a determination portions of the first load differ from portions of the second load, identifying the portions that differ to form a delta, storing the delta to form a stored delta and excluding the stored delta from a document object model associated with the identified page to form a modified document object model.

According to another embodiment, a computer program product resides on a computer readable medium that has a plurality of instructions stored on it. When executed by a processor, the instructions cause the processor to perform operations comprising identifying a web page of interest to form an identified page, loading the identified page a first time to form a first load, responsive to a determination that a delta has not been computed for the identified web page, loading the identified page a second time to form a second load and determining whether portions of the first load differ from portions of the second load. Responsive to a determination portions of the first load differ from portions of the second load, identifying the portions that differ to form a delta, storing the delta to form stored delta and excluding the stored delta from a document object model associated with the identified page to form a modified document object model.

According to another embodiment, an apparatus for computing excluded data comprises a communications fabric, a memory connected to the communications fabric, wherein the memory contains a plurality of instructions, a communications unit connected to the communications fabric, an input/output unit connected to the communications fabric, a display connected to the communications fabric and a processor unit connected to the communications fabric. The processor unit executes the instructions to direct the apparatus to identify a web page of interest to form an identified page, load the identified page a first time to form a first load, responsive to a determination that a delta has not been computed for the identified web page, load the identified page a second time to form a second load, and determine whether portions of the first load differ from portions of the second load. Responsive to a determination portions of the first load differ from portions of the second load, the processor unit executes the instructions to direct the apparatus to identify the portions that differ to form a delta, store the delta to form stored delta and exclude the stored delta from a document object model associated with the identified page to form a modified document object model.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 5 is a text representation of a sample web page code, in accordance with one embodiment of the disclosure;

DETAILED DESCRIPTION OF THE EMBODIMENTS

Figure 1:
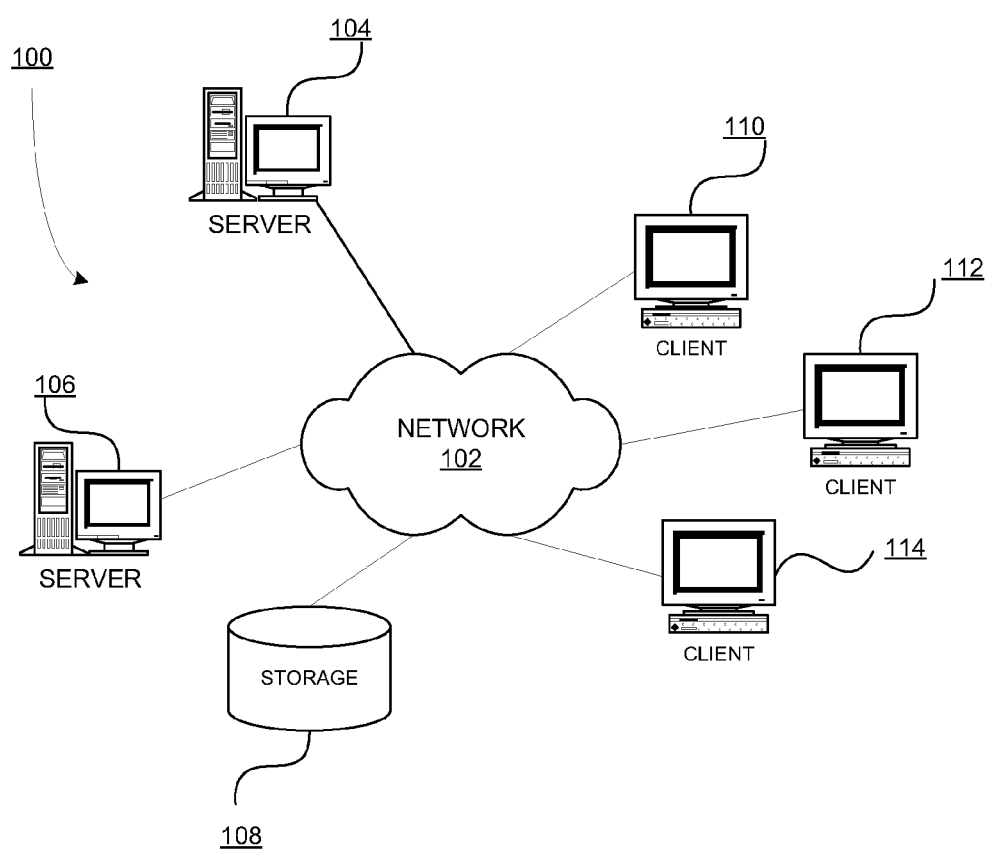
FIG. 1 is a block diagram of an exemplary data processing system network operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks or registered trademarks of Oracle and/or its affiliates. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
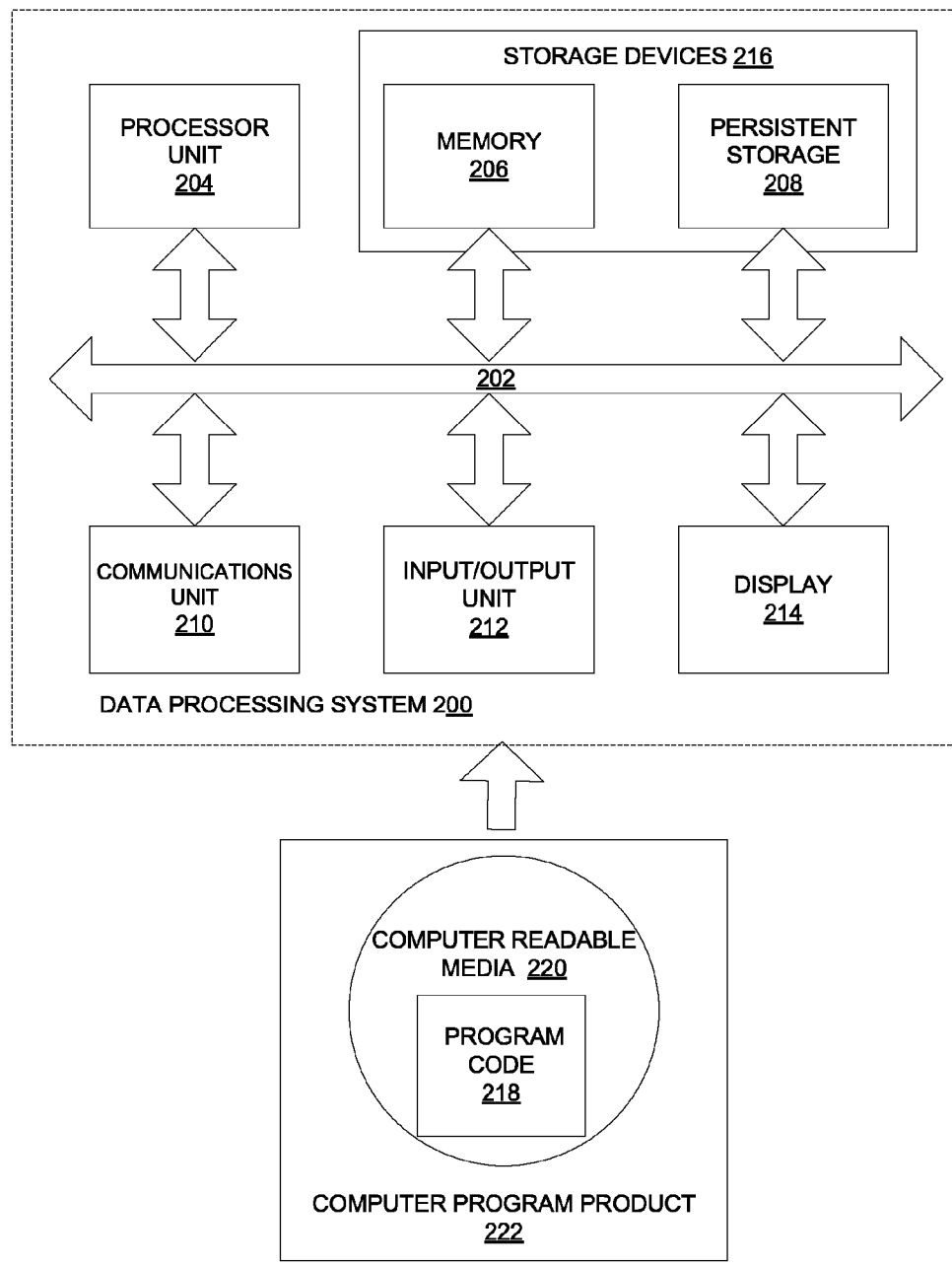
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which may be the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 may provide data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 may include communications fabric 202, which provides communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which may be in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 may located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for computing excluded data is presented. Processor unit 204 may receive web page information typically using communications unit 210, or input/output unit 212. Processor unit 204 may identify a web page of interest to form an identified page, may load the identified page a first time to form a first load, responsive to a determination that a delta has not been computed for the identified web page, may load the identified page a second time to form a second load. The first load and the second load may be stored temporarily in storage devices 216. Processor unit 204 may determine whether portions of the first load differ from portions of the second load. Responsive to a determination portions of the first load differ from portions of the second load, processor unit 204 may identify the portions that differ to form a delta, may store the delta to form a stored delta and may exclude the stored delta from a document object model associated with the identified page to form a modified document object model.

In another example, a computer-implemented process, using program code 218 stored in memory 206 or as a computer program product 222, for computing excluded data may comprise a computer recordable storage media, such as computer readable media 220, containing computer executable program code stored thereon. The computer executable program code comprises computer executable program code for excluding data.

In another illustrative embodiment, the process for computing excluded data may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus may execute the computer executable program code to direct the apparatus to exclude data.

The previously stated problem may be addressed, e.g., using the disclosed process when the webpages of a website are visited twice or more and respective DOM differences are tracked on a page-by-page bases. More specifically, using the disclosed process, a web page may be loaded at least twice (at two different moments in time) before analysis of the web page at a given URL. Portions of the DOM that differ across the web page loads may be safely excluded from a DOM equivalence function.

Figure 3:
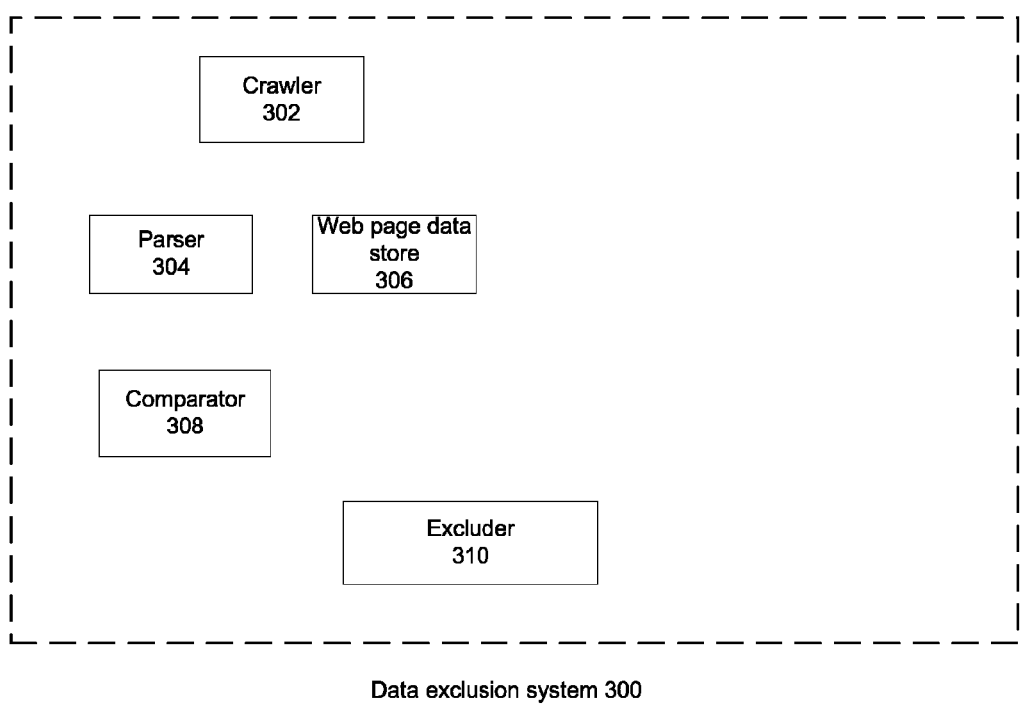
FIG. 3 is a block diagram of components of a data exclusion system, in accordance with various embodiments of the disclosure.

With reference to FIG. 3, a block diagram of components of a data exclusion system, in accordance with various embodiments of the disclosure is presented. Data exclusion system 300 is an example of a system providing a capability for programmatic exclusion of irrelevant data from a document object model equivalence function for crawling web sites.

Data exclusion system 300 may include a number of components leveraging an underlying data processing system such as data processing system 200 of FIG. 2. The components of data exclusion system 300 may comprise crawler 302, parser 304, web page data store 306, comparator 308 and excluder 310.

Crawler 302 may provide a capability to traverse typical web pages comprising a network of web pages. For example, crawler 302 may function as a typical web page based mechanism capable of traversing a collection of related web pages such as those comprising a web site.

A web crawler for Web 1.0 technologies may decide whether it has already visited a given web page, to avoid infinite crawling and to construct an accurate model of a website. In addition, a web crawler that also models a rich Internet application (RIA) may need to construct a model for each web page. This model may be composed of multiple states, each of which may be uniquely identified. Failure to identify each unique state may imply the model is incomplete and may further mean the crawler could run into infinite loops trying to model a single rich Internet application web page thus causing the crawler to falsely identify new states.

A web page may be a document in the World Wide Web defined by a unique universal resource locator (URL) and associated document object model content. A loaded web page may represent the DOM content of a web page after the execution of an onLoad event for that page, and prior to execution of any other JavaScript® event (such as operations of onClick, onKeyPressed). Java and all Java-based trademarks and logos are trademarks or registered trademarks of Oracle and/or its affiliates. In addition, for Web 2.0 applications, a web page can have multiple states as a result of executing JavaScript operations on the loaded web page. A website may be a collection of related web pages.

Parser 304 may provide a capability of reading the source code representing a web page and determining an action according to the coding. For example, a source code for a web page may use extensible markup language (XML) and other scripting language elements. Parser 304 may be used to interpret the information contained within the source code and provide a context in which the code is used. For example, an XML parser may convert an XML document into an XML DOM object, which is then manipulated with JavaScript.

Web page store 306 may be a storage area containing a data structure representing a document object model associated with a respective web page. Web page store 306 may provide a capability to persist a result of a crawled web page for subsequent processing. For example, when a difference is computed between a first load and a second load of a web page, the difference can be stored using web page store 306 in later processing operations.

Comparator 308 may provide a capability to perform comparison operations using web page information. For example, comparator 308 may be used to compare information of an input representing an instance of a web page with an input representing an instance of another web page or another instance of a same web page. The comparison may result in differences between the inputs when such differences exist. For example, when using a Web. 2.0 application web page, the disclosed process may be applied on the loaded page (e.g., to compute a delta, and store the delta in memory) and after executing any JavaScript event on the page, stored delta for the current page may be used to exclude computed delta from the DOM of the state before sending the DOM to a comparison unit.

Excluder 310 may provide a capability to selectively remove an identified difference resulting from use of comparator 308 from an input representing a web page. For example, when a result of a comparison between a first and second instance of a web page produces a difference represented by a string, the string may be deleted or excluded from the initial input used. Excluder 310 in one embodiment may be implemented as a specialized tool for deleting difference data in XML from a DOM representation of a web page. In another embodiment, excluder 310 may be an editor or editor subset providing sufficient function to delete strings identified as a difference or a delta from an identified input.

Figure 4:
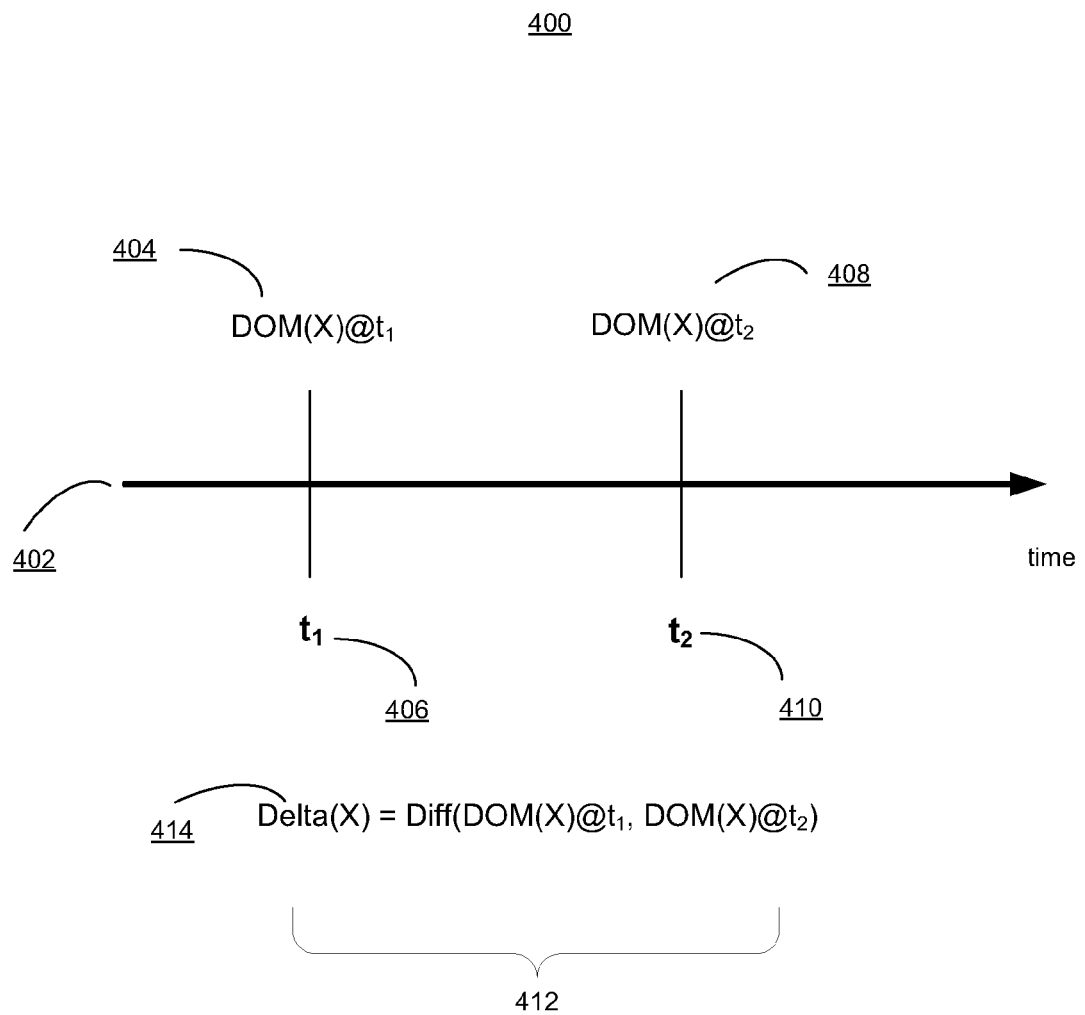
FIG. 4 is a schematic diagram of a high-level delta identification process, in accordance with one embodiment of the disclosure.

With reference to FIG. 4, a schematic diagram of a high-level delta identification process, in accordance with one embodiment of the disclosure is presented. Process 400 is a high level view of a delta identification process using the data exclusion system 300 of FIG. 3.

Using process 400, web pages of a web site may be visited twice or more and DOM differences may be tracked page-by-page. More specifically, before analyzing a page at a given URL, the page may be loaded at least twice (at two different moments in time). The portions of the DOM that are different in different loads can be safely excluded from a subsequent DOM equivalence function thereby improving accuracy of crawling.

For example, typical websites may change content over two consecutive page loads. The differences are typically, e.g., advertisement links, usage statistics, timestamps that must be ignored by crawlers, or other differences. Failure to ignore this type of information typically leads to creation of a large or infinite number of states, because the state equivalence method likely separates the states based on these differences.

Automating the detection of irrelevant page sections may be needed because the differences may be page specific and as a consequence, irrelevant parts may vary from page to page even within a same website. Consequently, requiring a user to manually highlight the sections may be impracticable. The concern applies equally well to defining regular expressions. The regular expressions may differ from site to site and the capture of all combinations is neither trivial nor possible.

To automatically, or programmatically, identify data that can be safely ignored from a web page when computing DOM equivalence, the web page may be visited at least twice. Timeline 402 includes $t_1$ 406 and $t_2$ 410 as two distinct points in time.

Assume for example purposes only that a crawler reaches and loads a web page X at time $t_1$ 406 produces DOM(X)@$t_1$ 404. The same web page X loaded at time $t_2$ 410 produces DOM(X)@$t_2$ 408. Typically the two DOMs will not be identical. Let Delta(X) 414 represent the differences between DOM(X)@$t_1$ 404 and DOM(X)@$t_2$ 408 as in expression 412. Delta(X) 414 is the information excluded from the DOM equivalence function for web page X.

Delta(X) 414 can be computed as a string difference between the two DOMs, or can be pictured as a collection of XPath values. Each of the XPath values points to an element/location of the DOM that can be ignored. When an attribute value is different between two DOMs, the XPath may not only point to the node, but may also point to that attribute within the node that is not consistent in time. Delta(X) 414 may be generally expressed as a difference function in expression 412, for example, using an XOR operation on the strings to compute a difference. Other computation methods to determine a difference may be used equally well.

The crawler may record Delta(X) 414 as being the irrelevant information to be excluded for any future DOM comparisons for the current web page X. With reference to a WEB 1.0 crawler that crawls a website for indexing, Delta(X) 414 may not be indexed, rather Delta(X) 414 may be ignored. An RIA crawler may, in addition, exclude this information from a state equivalence function applied to the current page X when constructing a respective model.

With reference to FIG. 5, a text representation of a sample web page code, in accordance with one embodiment of the disclosure is presented. Code snippet 500 is an example of a portion of a web page, after rendering, used with the data exclusion system 300 of FIG. 3.

In the example, a web page X, after rendering, may contain code snippet 500 comprising, e.g., html code. Assume for example purposes only that web page X displays current time 502, and also displays one random sponsor 504 at a time. Further, let DOM(X)@$t_1$ be the above code. Thus, a different request to the same server for page X may return a different timestamp and different sponsor.

Assume for example purposes only that the second time page X is visited, the content changes and current time 502 is "1:45:31 pm" and the sponsor 504 is represented by http://mysite/aclk?sa=l&ai=Ba4&adurl=http://www.mysite.

Delta(X) may be computed as being the list of differences determined by Delta(X)={html\body\div\, html\body\a\@href}.

In addition, consider that this web page may also contain dynamic content in a form of JavaScript events that an RIA crawler may need to execute. The crawler may run into infinite loops when the crawler does not ignore the Delta(X) part from the page model, hence the values are likely to change all the time. The impact of this change may lead to invalid states. The concept of excluding Delta(X) from the DOM can typically be applied to any DOM comparison method currently used.

Figure 6:
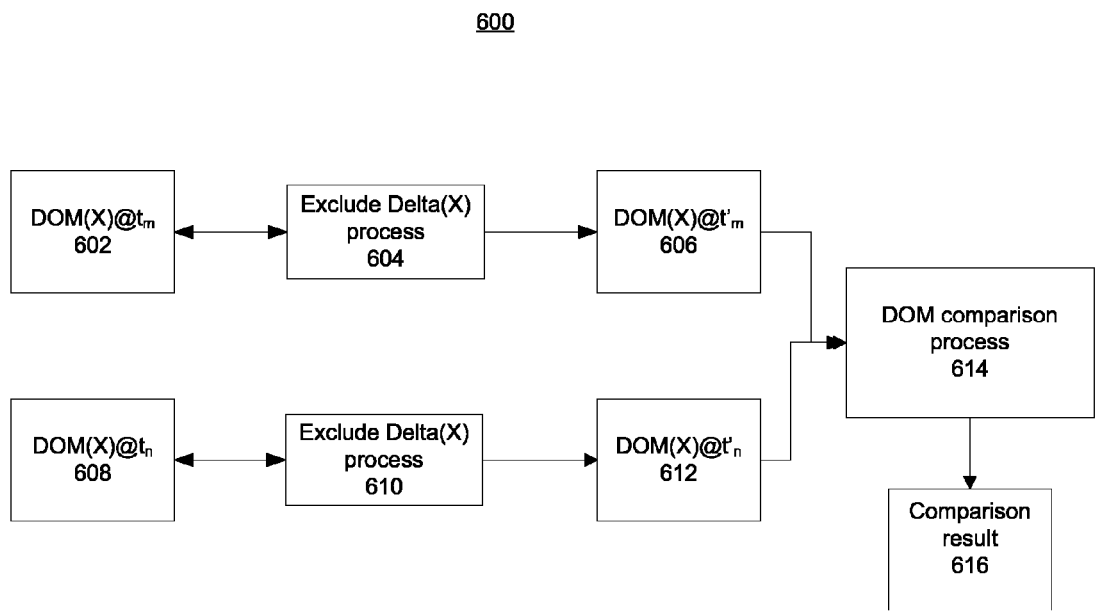
FIG. 6 is a block diagram of a data exclusion process, in accordance with one embodiment of the disclosure.

With reference to FIG. 6, a block diagram of a data exclusion process, in accordance with one embodiment of the disclosure is presented. Process 600 is an example of integrating a data exclusion process, using data exclusion system 300 of FIG. 3, with a DOM comparison process.

As can be seen, the DOM of page X may be extracted at two different timestamps, DOM(X)@$t_m$ 602 and DOM(X)@$t_n$ 608. Rather than passing DOM(X)@$t_m$ 602 and DOM(X)@$t_n$ 608 to DOM comparison process 614, the Delta(X) may be excluded from each in exclude Delta(X) process 604 and exclude Delta(X) process 610. The Delta(X), in one example of an initial page load, may be computed in advance by, e.g., loading page X twice as explained earlier in which Delta(X) 414 represented the differences between DOM(X)@$t_1$ 404 and DOM(X)@$t_2$ 408 as in expression 412, all of FIG. 4. The computed difference may be stored as a set of differences in which the set comprises one or more differences, for example, due to multiple events on a web page. There are typically many ways to exclude Delta(X) from the DOM. For example, each XPath that exists in the computed Delta(X) can be simply deleted from the DOM.

Additionally/alternatively, one or more XPaths from Delta(X) can be replaced with any of the $t_m$ or $t_n$ values. In other words, for these XPaths the $t_m$ values can be replaced with $t_n$ values or vice versa. After exclusion processing, the two values DOM(X)@$t'_m$ 606 and DOM(X)@$t'_n$ 612 may be equal. This may enable DOM comparison process 614 to see all XPaths in the Delta(X) as having the same values, and therefore not different. Another possible technique may replace one or more XPaths with a constant. The result of replacements, as in the earlier case described, may enable DOM comparison process 614 to identify no difference in the values of the XPaths.

Regardless of the method used to exclude the Delta(X) from each input DOM, the exclusion process may be transparent to DOM comparison process 614. Process 600 illustrates the process of DOM(X)@$t_m$ 602 and DOM(X)@$t_n$ 608 transformed into DOM(X)@$t'_m$ 606 and DOM(X)@$t'_n$ 612 respectively. The two new DOMs may be sent to DOM comparison process 614 to produce comparison result 616.

Figure 7:
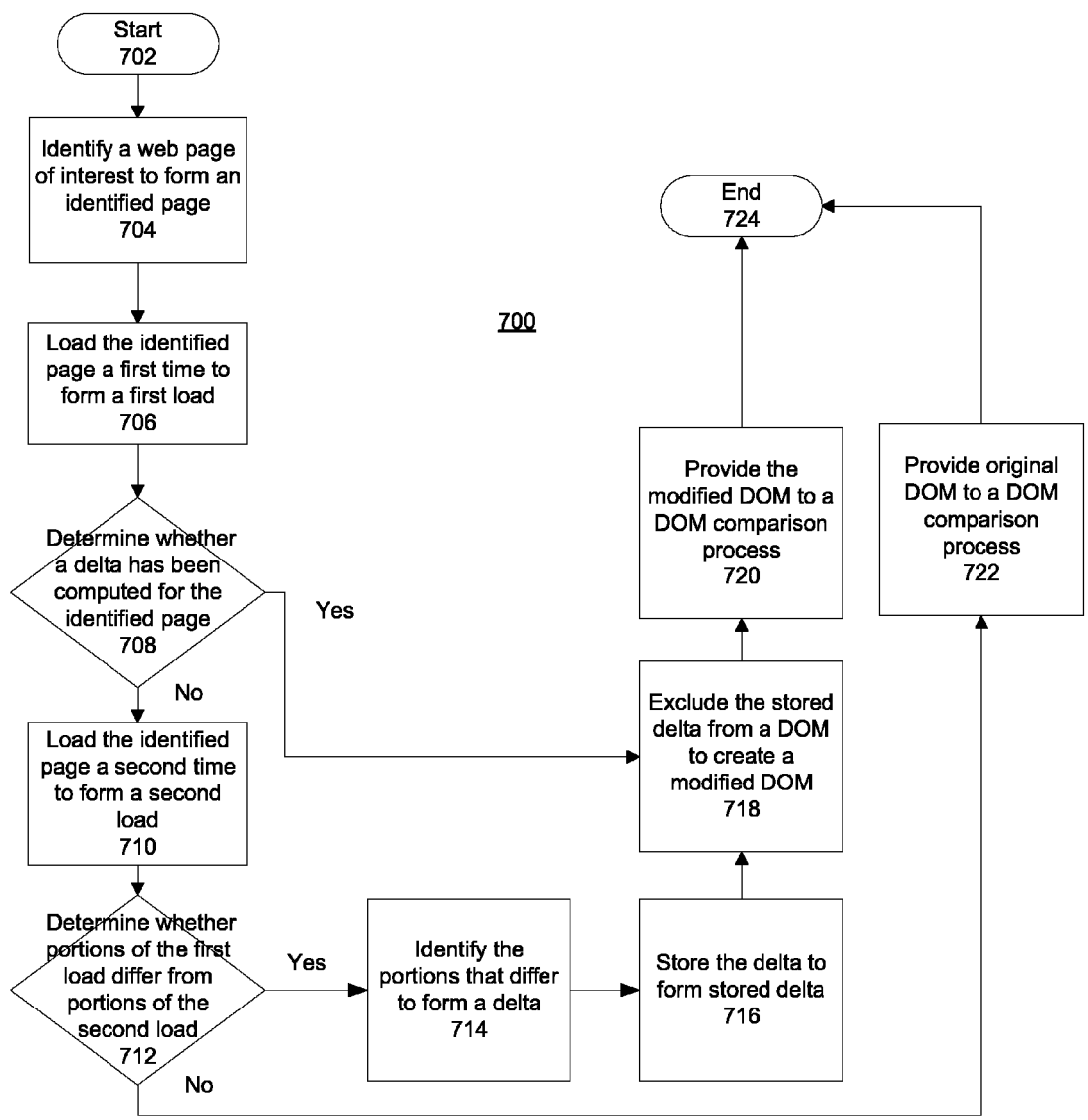
FIG. 7 is a flowchart of a process for computing excluded data using the process of FIG. 6, in accordance with one embodiment of the disclosure.

With reference to FIG. 7, a flowchart of a process for computing excluded data, in accordance with one embodiment of the disclosure is presented. Process 700 is an example of a data exclusion computation, for use with a DOM comparison process, process using the data exclusion system 300 of FIG. 3.

Process 700 begins (702) and may identify a web page of interest to form an identified web page (704). Process 700 may load the identified web page a first time to form a first load (706). Process 700 may determine whether a delta has been computed for the identified page (708). Responsive to a determination that a delta has not been computed for the identified page, process 700 may load the identified web page a second time to form a second load (710). The time between the first load and the second load can be a predefined interval and is typically of short duration however longer intervals may also be used. The respective page loads may be maintained in a Web page store, such as Web page store 306 of FIG. 3, as a storage area containing a data structure representing a document object model associated with a respective web page for subsequent processing. Responsive to a determination that a delta has been computed for the identified page, process 700 may advance to (718).

Process 700 may determine whether portions of the first load differ from portions of the second load (712). Responsive to a determination that portions of the first load do not differ from portions of the second load, process 700 may advance to provide original DOM to a DOM comparison process (722) and may terminate thereafter (724).

Responsive to a determination that portions of the first load differ from portions of the second load, process 700 may identify the portions that differ to form a delta (714). Process 700 may store the delta to form a stored delta (716). Stored delta may represent a set of differences. Process 700 may exclude the stored delta from a DOM to create a modified DOM (718). Process 700 may provide the modified DOM to a DOM comparison process (720) and may terminate thereafter (724). The DOM comparison process may be a typical DOM comparison process used currently and need not be altered to incorporate data of the disclosed process. The modified DOM may be stored temporarily in a Web page store for subsequent processing in the DOM comparison process or passed directly to the DOM comparison process.

Figure 8:
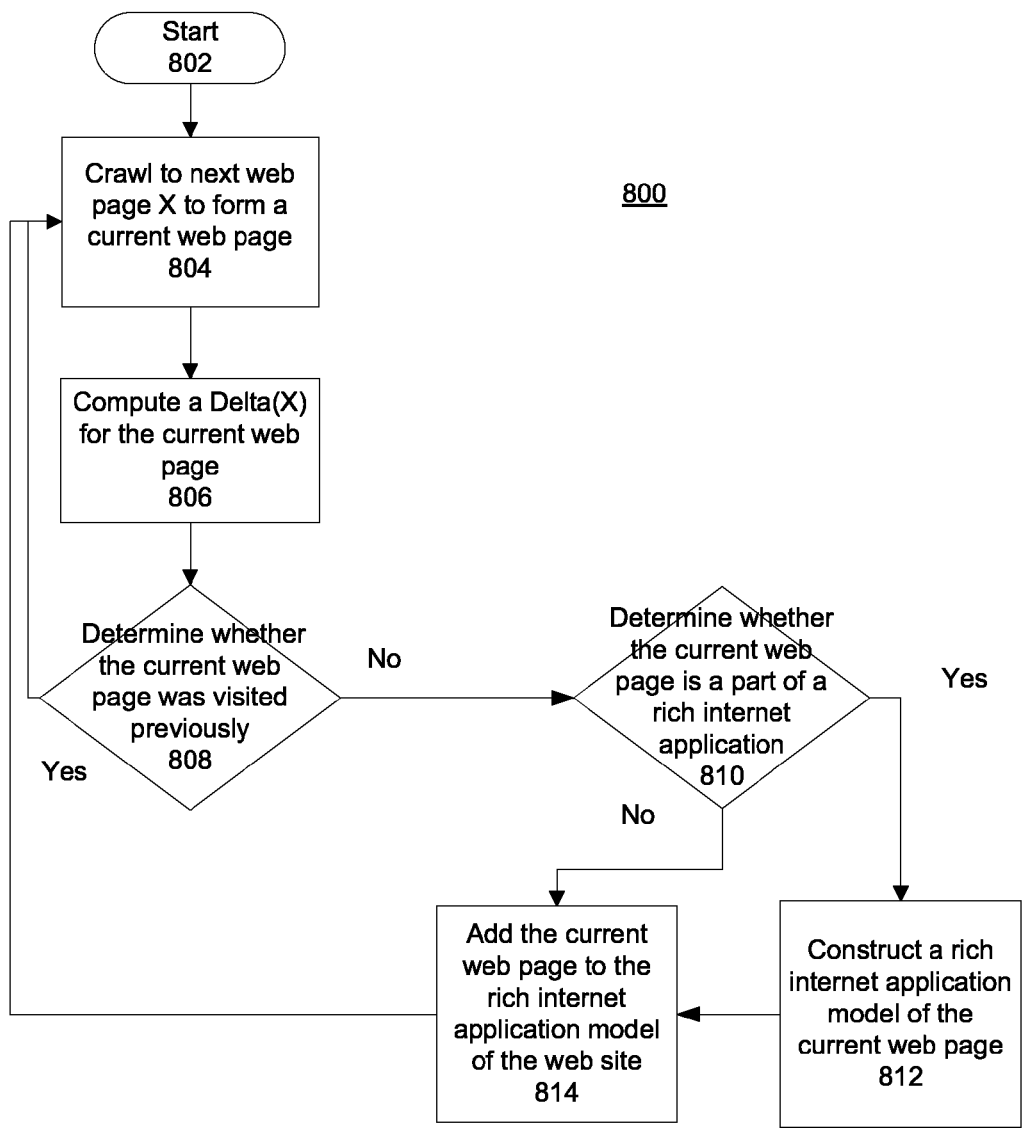
FIG. 8 is a flowchart of a data exclusion process used in a crawling paradigm, using the process of FIG. 7, in accordance with one embodiment of the disclosure.

With reference to FIG. 8, a flowchart of a data exclusion process used in a crawling paradigm, in accordance with one embodiment of the disclosure is presented. Process 800 is an example of using the data exclusion process 600 of FIG. 6.

Process 800 provides an example of a crawling process, which applies process 600 of FIG. 6 in the context of data exclusion system 300 of FIG. 3 to the crawling paradigm in general.

Process 800 begins (802) and may crawl to a next web page X to form a current web page (804). Process 800 may compute a Delta(X) for the current web page (806). As stated previously, Delta(X) may represent a set of differences, wherein the set may comprise one or more differences. Process 800 may determine whether the current web page was visited previously (808). 808 may further exclude the Delta(X) information from the DOM comparison function by, e.g., comparing the current web page X against the web pages in the current model of the website.

Responsive to a determination that the current web page was visited previously process 800 may loop back to 804 as before. Responsive to a determination that the current web page was not visited previously, process 800 may determine whether the current web page is part of a rich Internet application (810). Responsive to a determination that the current web page is part of a rich Internet application process 800 may construct a rich Internet application model of the current web page (812). 812 may also exclude the Delta(X) information from the DOM comparison function by, e.g., excluding the Delta(X) from the state equivalence method of the RIA model. Responsive to a determination that the current web page is not part of a rich Internet application, process 800 may skip ahead to 814.

Process 800 may add the current web page to the rich Internet application model of the web site (814) and may loop back to 804 as before.

In addition, when computing Delta(X), to further increase differences between two consecutive loads, the crawler can redirect one of the two requests through a proxy. Typically, web pages display different content based on the origin of a request. For example, users from different countries or even provinces typically see different advertisements when visiting the same web page.

In the current examples, the disclosed exclusion process may track Delta(X) and may exclude Delta(X) from the DOM comparison process. Alternatively, the disclosed process could track parts in the DOM that do not change in time and consider only those parts for use with the DOM comparison process. Common parts of the DOM may then function as a mask to the current DOM. Regardless of the exclusion technique chosen, the effect may be the same in that the Delta(X) may be excluded from the data sent to the DOM comparison function.

In the example using an RIA crawler, the DOM comparison function may be called numerous times during the process of building an RIA model for the current page, thus, improving the results of the disclosed process and typically increasing the accuracy of the final model.

The techniques used to perform the state equivalence operation (for example, DOM comparison) are out of the scope of this disclosure and do not affect the outcome. Illustrative embodiments of the disclosed process depict, e.g., using a pre-process operation to compute data exclusion, how to compute data that can be safely excluded from the DOM comparison.

Thus is presented a computer-implemented process for computing excluded data. The computer-implemented process may identify a web page of interest to form an identified page, may load the identified page a first time to form a first load in a data structure, responsive to a determination that a delta has not been computed for the identified web page, may load the identified page a second time to form a second load in the data structure and may determine whether portions of the first load differ from portions of the second load. Responsive to a determination portions of the first load differ from portions of the second load, the computer-implemented process may identify the portions that differ to form a delta, may store the delta to form a stored delta and may exclude the stored delta from a document object model associated with the identified page to form a modified document object model.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications and/or any combinations of embodiment(s) as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications and/or any combinations of embodiment(s) as are suited to the particular use contemplated.

What is claimed is:

1. A computer-implemented process for computing excluded data, the computer-implemented process comprising:
    identifying a web page of interest to form an identified page;
    loading the identified page a first time to form a first load;
    responsive to a determination that a delta has not been computed for the identified web page, loading the identified page a second time to form a second load, wherein the second load is based, at least in part, upon the use of a proxy;
    determining whether portions of the first load differ from portions of the second load;
    responsive to a determination portions of the first load differ from portions of the second load, identifying the portions that differ to form a delta;
    storing the delta to form a stored delta;
    excluding the stored delta from a document object model associated with the identified page to form a modified document object model;
    excluding the stored delta from a document object model comparison process, wherein the document object model comparison process from which the stored delta is excluded is a document object model equivalence function, wherein the excluded stored delta includes one or more page sections ignored by crawlers; and
    if the identified page is part of a rich Internet application, adding the identified page to a rich Internet application model.

2. The computer-implemented process of claim 1 wherein loading the identified page a second time to form a second load comprises: loading the identified page one or more times at distinct points in time after loading the identified page the first time to form the first load, wherein a time interval between the first load and the second load is predetermined.

3. The computer-implemented process of claim 1 wherein identifying the portions that differ to form a delta comprises: identifying a collection of XPath values, wherein each XPath value points to element of a document object model to ignore and when an attribute value differs, the XPath value also points to that attribute.

4. The computer-implemented process of claim 1 wherein identifying the portions that differ to form a delta comprises: identifying the portions that differ as differences between a document object model of the first load and a document object model the second load.

5. The computer-implemented process of claim 1 wherein excluding the stored delta from a document object model associated with the identified page to form a modified document object model comprises: tracking a Delta(X) and excluding the Delta(X) from the document object model comparison process.

6. The computer-implemented process of claim 1 wherein excluding the stored delta from a document object model associated with the identified page to form a modified document object model comprises:
>tracking parts in a document object model that do not change in time; and
>using the parts with a document object model comparison process wherein common parts of the document object model functions as a mask to a current document object model.

7. The computer-implemented process of claim 1 wherein excluding the stored delta from a document object model associated with the identified page to form a modified document object model comprises: sending the modified document object model to the document object model comparison process.

8. A computer program product residing on a non-transitory computer readable medium having a plurality of instructions stored thereon which, when executed by a processor, cause the processor to perform operations comprising:
>identifying a web page of interest to form an identified page;
>loading the identified page a first time to form a first load, wherein the second load is based, at least in part, upon the use of a proxy;
>responsive to a determination that a delta has not been computed for the identified web page, loading the identified page a second time to form a second load;
>determining whether portions of the first load differ from portions of the second load; responsive to a determination portions of the first load differ from portions of the second load, identifying the portions that differ to form a delta;
>storing the delta to form a stored delta;
>excluding the delta from a document object model associated with the identified page to form a modified document object model;
>excluding the stored delta from a document object model comparison process, wherein the document object model comparison process from which the stored delta is excluded is a document object model equivalence function, wherein the excluded stored delta includes one or more page sections ignored by crawlers; and
>if the identified page is part of a rich Internet application, adding the identified page to a rich Internet application model.

9. The computer program product of claim 8 wherein the operation of loading the identified page a second time to form a second load comprises: loading the identified page one or more times at distinct points in time after loading the identified page the first time to form the first load, wherein a time interval between the first load and the second load is predetermined.

10. The computer program product of claim 8 wherein the operation of identifying the portions that differ to form a delta comprises: identifying a collection of XPath values, wherein each XPath value points to element of a document object model to ignore and when an attribute value differs, the XPath value also points to that attribute.

11. The computer program product of claim 8 wherein the operation of identifying the portions that differ to form a delta comprises: identifying the portions that differ as differences between a document object model of the first load and the document object model the second load.

12. The computer program product of claim 8 wherein the operation of excluding the stored delta from a document object model associated with the identified page to form a modified document object model further comprises: tracking a Delta(X) and excluding the Delta(X) from the document object model comparison process.

13. The computer program product of claim 8 wherein the operation of excluding the stored delta from a document object model associated with the identified page to form a modified document object model comprises:
>tracking parts in a document object model that do not change in time; and
>using the parts with a document object model comparison process wherein common parts of the document object model functions as a mask to a current document object model.

14. The computer program product of claim 8 wherein the operation of excluding the stored delta from a document object model associated with the identified page to form a modified document object model comprises: sending the modified document object model to a document object model comparison process.

15. An apparatus for computing excluded data, the apparatus comprising:
>a communications fabric;
>a memory connected to the communications fabric, wherein the memory contains computer executable program code;
>a communications unit connected to the communications fabric;
>an input/output unit connected to the communications fabric;
>a display connected to the communications fabric; and
>a processor unit connected to the communications fabric, wherein the processor unit executes the computer executable program code to direct the apparatus to:
>>identify a web page of interest to form an identified page;
>>load the identified page a first time to form a first load;
>>responsive to a determination that a delta has not been computed for the identified web page, load the identified page a second time to form a second load;
>>wherein the second load is based, at least in part, upon the use of a proxy;
>>determine whether portions of the first load differ from portions of the second load;
>>responsive to a determination portions of the first load differ from portions of the second load, identify the portions that differ to form a delta;
>>store the delta to form a stored delta;
>>exclude the stored delta from a document object model associated with the identified page to form a modified document object model;
>>exclude the stored delta from a document object model comparison process, wherein the document object model comparison process from which the stored delta is excluded is a document object model equivalence function, wherein the excluded stored delta includes one or more page sections ignored by crawlers; and
>>if the identified page is part of a rich Internet application, add the identified page to a rich Internet application model.

16. The apparatus of claim 15 wherein the processor unit executes the computer executable program code, responsive to a determination that a delta has been computed for the identified web page, to load the identified page a second time to form a second load further directs the apparatus to: load the identified page one or more times at distinct points in time after loading the identified page the first time to form the first load, wherein a time interval between the first load and the second load is predetermined.

17. The apparatus of claim 15 wherein the processor unit executes the computer executable program code to identify the portions that differ to form a delta further directs the apparatus to: identify a collection of XPath values, wherein each XPath value points to element of a document object model to ignore and when an attribute value differs, the XPath value also points to that attribute.

18. The apparatus of claim 15 wherein the processor unit executes the computer executable program code to identify the portions that differ to form a delta further directs the apparatus to: identify the portions that differ as differences between a document object model of the first load and a document object model the second load.

19. The apparatus of claim 15 wherein the processor unit executes the computer executable program code to exclude the stored delta from a document object model associated with the identified page to form a modified document object model further directs the apparatus to: track a Delta(X) and excluding the Delta(X) from the document object model comparison process.

20. The apparatus of claim 15 wherein the processor unit executes the computer executable program code to exclude the stored delta from a document object model associated with the identified page to form a modified document object model further directs the apparatus to:
  track parts in a document object model that do not change in time; and
  use the parts with a document object model comparison process wherein common parts of the document object model functions as a mask to a current document object model.

* * * * *